United States Patent
Zizka (10) Patent No.: US 11,368,416 B2
(45) Date of Patent: *Jun. 21, 2022

(54) RECONCILIATION OF A BLOCKCHAIN LEDGER DURING FAILURES OF AN ENTERPRISE SERVICE BUS

(71) Applicant: Red Hat, Inc., Raleigh, NC (US)

(72) Inventor: Ondrej Zizka, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/121,494

(22) Filed: Dec. 14, 2020

(65) Prior Publication Data

US 2021/0099404 A1  Apr. 1, 2021

Related U.S. Application Data

(63) Continuation of application No. 15/886,662, filed on Feb. 1, 2018, now Pat. No. 10,887,254.

(51) Int. Cl.
*H04L 51/02* (2022.01)
*G06Q 10/10* (2012.01)
(Continued)

(52) U.S. Cl.
CPC .............. *H04L 51/02* (2013.01); *G06F 9/541* (2013.01); *G06Q 10/107* (2013.01);
(Continued)

(58) Field of Classification Search
CPC ..... H04L 51/02; H04L 9/0637; H04L 63/123; H04L 67/104; H04L 2009/38; G06F 9/541; G06Q 10/107
See application file for complete search history.

(56) References Cited

U.S. PATENT DOCUMENTS

2005/0119942 A1*  6/2005  Horrocks ........... G06Q 30/0637
                                                    705/26.82
2016/0055322 A1    2/2016  Thomas
(Continued)

FOREIGN PATENT DOCUMENTS

WO       20170236120 A1    10/2017

OTHER PUBLICATIONS

"BitCongress," https://bravenewcoin.com/assets/Whitepapers/BitCongressWhitepaper.pdf, 10 pages.
(Continued)

*Primary Examiner* — Viet D Vu
(74) *Attorney, Agent, or Firm* — Womble Bond Dickinson (US) LLP (57) ABSTRACT

Enterprise messaging using a blockchain system. A method of the disclosure includes receiving, by a first node of a blockchain system of an enterprise service bus, a message transmitted by a second node of the blockchain system. The blockchain system may be to store a plurality of messages communicated via the enterprise service bus in a distributed ledger. The method also includes determining, by the first node, whether the first node should process the message. The method further includes processing, by the first node, the message in response to determining that the message should be processed by the first node. The method further includes updating the distributed ledger to indicate that the message has been processed by the first node.

20 Claims, 7 Drawing Sheets

(51) Int. Cl.
*G06F 9/54* (2006.01)
*H04L 67/104* (2022.01)
*H04L 9/06* (2006.01)
*H04L 9/40* (2022.01)

(52) U.S. Cl.
CPC .......... *H04L 9/0637* (2013.01); *H04L 63/123* (2013.01); *H04L 67/104* (2013.01); *H04L 2209/38* (2013.01)

(56) References Cited

U.S. PATENT DOCUMENTS

| | | |
|---|---|---|
| 2016/0260169 A1 | 9/2016 | Arnold et al. |
| 2016/0261690 A1 | 9/2016 | Ford |
| 2017/0046651 A1 | 2/2017 | Lin et al. |
| 2017/0046693 A1 | 2/2017 | Haldenby et al. |
| 2017/0053249 A1* | 2/2017 | Tunnell .................. G09C 5/00 |
| 2017/0236120 A1 | 8/2017 | Herlihy et al. |
| 2018/0046992 A1 | 2/2018 | Hanrahan et al. |
| 2018/0096360 A1* | 4/2018 | Christidis .............. G06Q 20/02 |
| 2018/0101842 A1* | 4/2018 | Ventura ................. G06F 3/0619 |
| 2018/0145836 A1* | 5/2018 | Saur ..................... G06Q 20/3829 |
| 2018/0293553 A1* | 10/2018 | Dembo .............. G06Q 20/0655 |
| 2018/0349207 A1* | 12/2018 | Erickson ............... G06F 40/263 |
| 2018/0349621 A1* | 12/2018 | Schvey ................ G06Q 20/223 |
| 2019/0026685 A1 | 1/2019 | Chappell et al. |
| 2019/0130483 A1* | 5/2019 | de Jong ................ G06Q 20/40 |

OTHER PUBLICATIONS

Echo, "Free Encrypted Private Chat + Instant Cloud Money Transfer," https://my-echo.com/, Oct. 27, 2017, 14 pages.
"Mercury Protocol," https://www.mercuryprotocol.com/files/Mercury_Protocol_whitepaper.pdf, Aug. 23, 2017, 17 pages.
Warren, "Bitmessage: A Peer-to-Peer Message Authentication and Delivery System," https://bravenewcoin.com/assets/Whitepapers/bitmessage.pdf, Nov. 27, 2012, 5 pages.

* cited by examiner

RECONCILIATION OF A BLOCKCHAIN LEDGER DURING FAILURES OF AN ENTERPRISE SERVICE BUS

CROSS REFERENCE TO RELATED APPLICATIONS

This application is a continuation of U.S. patent application Ser. No. 15/886,662, filed Feb. 1, 2018, which is now U.S. Pat. No. 10,887,254, the entire contents of which is hereby incorporated by reference.

TECHNICAL FIELD

Aspects of the present disclosure relate to messaging, and more particularly, to messaging in an enterpriser service bus.

BACKGROUND

As computing architectures, applications, and software services become more complex, different portions the architectures, applications, or computing services may be distributed or divided across multiple computing devices. For example, different portions of an application may execute on different computing devices (e.g., different server computers). In another example, different software services may be provided by different computing devices. Because these computing architectures, applications, or software services may be distributed across multiple computing devices (or multiple datacenters), the different portions of the computing architectures, applications, and software services, may coordinate or communicate with each other using messages.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, different portions of computing architectures, applications, and software services, may coordinate or communicate with each other using messages because the different portions of the computing architectures, applications, or software services may be distributed across multiple computing devices (or multiple datacenters). An enterprise service bus (ESB) if often used as the communication system between the different portions of computing architectures, applications, and software services. The enterprise service bus may handle the transmission and receipt of the messages for the different portions of the computing architectures, applications, or software services that may need to communicate with each other. For example, the enterpriser service bus may route a message to the appropriate recipient. The enterprise service bus may also convert messages from one form or type to another form or type. The enterprise service bus may also inform the different portions of the computing architectures, applications, and software services via a message when events occur or when actions are performed by the different portions.

Messages between the different portions of the computing architectures, applications, and software services may not be communicated properly due to failures or malfunction in the enterprise service bus. If messages are not communicated properly between the different portions of the computing architectures, applications, and software services, the computing architectures, applications, and software services may end up in an inconsistent state cross the different portions. For example, if a message from a first software service is not delivered to all recipient software services, some of the recipient software services may perform an action based on receiving the message and other recipient software services may not perform the action because they did not receive the message. Generally, an enterprise service bus may not include a record or a history of the messages that are transmitted or received. This may cause problems messages are not delivered to one or more recipients due to a failure or malfunction in the enterprise service bus. Without the record or history of messages, it may be difficult to get the different portions of the computing architectures, applications, and software services back into a consistent state. In addition, security is a concern in an enterprise service bus. For example, a malicious user or entity may attempt to manipulate the messages communicated via the enterprise service bus. For example, a malicious user may intercept messages, may attempt to modify the messages, or may attempt to prevent the message from being delivered.

The present disclosure addresses the above-noted and other deficiencies by using a blockchain system in the enterprise service bus. The blockchain system may include a distributed ledger that is distributed across all of the nodes in the blockchain system. The distributed ledger may include a record of the messages, events, actions, operations, functions, results, or data that is communicated via the enterprise service bus. If portions of the enterprise service bus fails and messages are not delivered, the blockchain system has the capability to reconcile the different versions of the distributed ledger, as discussed in more detail below. In addition, because each node has a copy of the distributed ledger, it may be harder for a malicious user to manipulate the messages, as discussed in more detail below.

Figure 1:
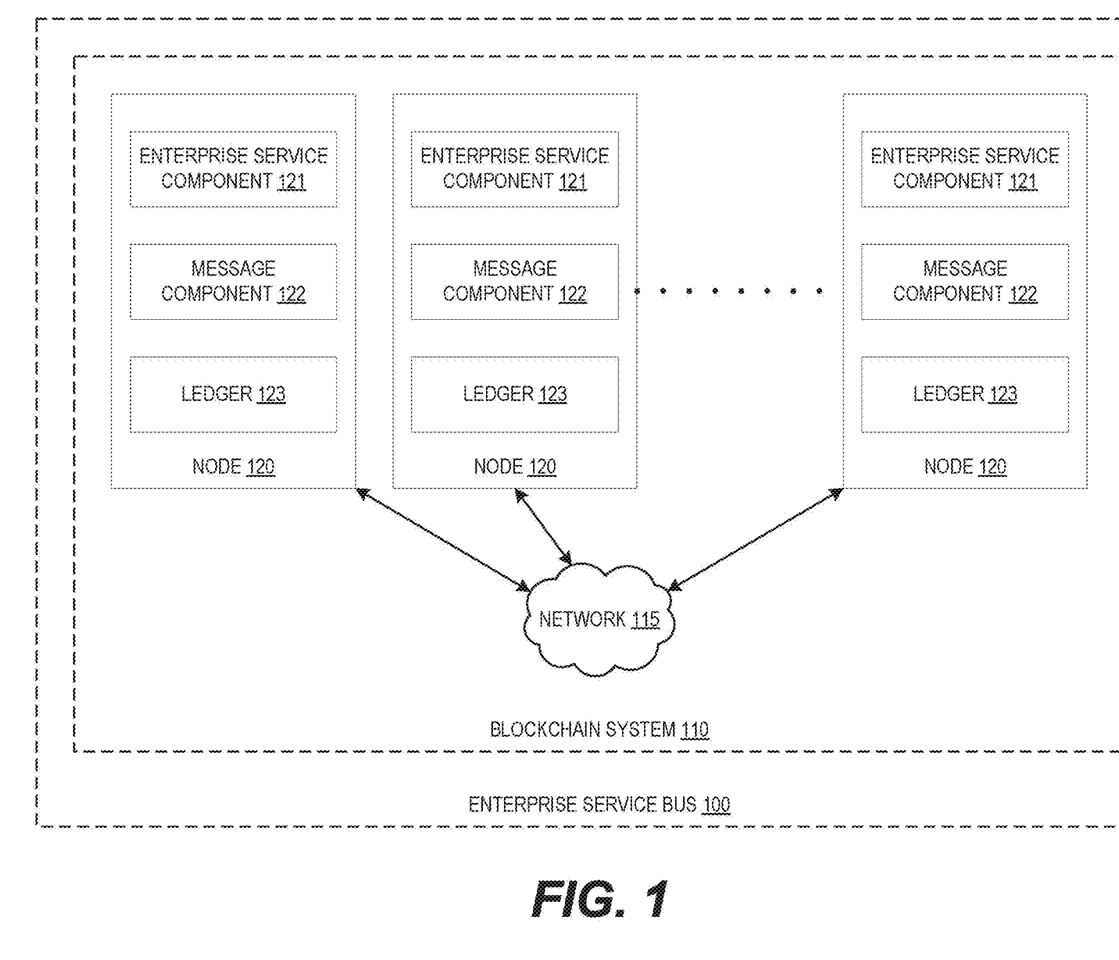
FIG. 1 is a block diagram that illustrates an example system architecture, in accordance with some embodiments of the present disclosure.

FIG. 1 is a block diagram that illustrates an example enterprise service bus, in accordance with some embodiments of the present disclosure. As illustrated in FIG. 1, the web application platform 100 includes an enterprise service bus 100. As discussed above, the enterprise service bus 100 may handle the transmission and receipt of the messages (e.g., may route a message to the appropriate recipient), may convert messages from one form or type to another form or type, or may inform different enterprise service components 121 via a message when events occur or when actions are performed by the different portions.

The enterprise service bus 100 includes a blockchain system 110. In one embodiment, a blockchain system may be a system that uses a ledger to record transactions (e.g., transmitting messages, processing messages, results of actions, etc.) in the system. The ledger includes a plurality of blocks which are linked together and are securing using cryptographic functions. For example, each block may include a hash of the previous block, a timestamp, and other data (e.g., a copy of the message, a result, etc.). The blockchain system 110 includes a set of nodes 120 (e.g., one or more nodes 120, a plurality of nodes 120, etc.) coupled to each other via a network 115. Network 115 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a wireless fidelity (WiFi) hotspot connected with the network 105 and/or a wireless carrier system that can be implemented using various data processing equipment, communication towers (e.g. cell towers), etc. The network 115 may carry communications (e.g., data, message, packets, frames, etc.) between the nodes 120.

Each node 120 includes a message component 121, an enterprise service component 122, and a ledger 123. Although the enterprise service component 121 and the message component 122 are illustrated in FIG. 1 as being separate, the enterprise service component 121 and the message component 122 may be combined into one component in other embodiments. In some embodiments, an enterprise service component 121 may be a portion of an application that is distributed across the nodes 120. In another embodiment, an enterprise service component 121 may be a software service that is part of a service oriented architecture (SOA). A node 120 may be a combination of one or more computing devices. A computing device may be any suitable type of computing device or machine that has a programmable processor including, for example, server computers, desktop computers, laptop computers, tablet computers, smartphones, set-top boxes, etc. In some examples, a computing device may comprise a single machine or may include multiple interconnected machines (e.g., multiple servers configured in a cluster). A node 120 may also be one or more virtual environments. In one embodiment, a virtual environment 113 may be a virtual machine (VM) that may execute on a hypervisor which executes on top of the OS for a computing device. The hypervisor may manage system sources (including access to hardware devices, such as processors, memories, storage devices). The hypervisor may also emulate the hardware (or other physical resources) which may be used by the VMs to execute software/applications. In another embodiment, a virtual environment may be a container that may execute on a container engine which executes on top of the OS for a computing device, as discussed in more detail below. The container engine may allow different containers to share the OS of a computing device (e.g., the OS kernel, binaries, libraries, etc.). The enterprise service bus 100 may use the same type or different types of virtual environments. For example, all of the nodes 120 may be VMs. In another example, all of the nodes 120 may be containers. In a further example, some of the nodes 120 may be VMs, other nodes 120 may be containers, and other nodes may be computing devices (or groups of computing devices).

In one embodiment, an enterprise service component 122 may be one or more applications or services that may perform actions, operations, functions, methods, calculations, etc., for users of the system architecture 100 (e.g., for client computing devices that may use the system architecture), or may also provide services, functionalities, resources, etc., for the users of the system architecture 100. Different enterprise service components 122 may perform different functions, operations, actions, processes, methods, etc., or may provide different services, functionalities, resources, etc. For example, a first web enterprise service component 122 may allow users to view streaming videos and a second enterprise service component 122 may allow users to access their bank accounts. Although each node 120 is illustrated in FIG. 1 as including one enterprise service component 121, a node may have multiple enterprise service components 121 in other embodiments.

In one embodiment, a ledger 123 (e.g., a distributed ledger) may be records of messages, results, transactions, events, actions, operations, and/or other types of data that are communicated between the nodes 120 (e.g., between enterprise service components 150). For example, a block (e.g., a record, a block, an entry, etc.) may be added to the ledger 123 each time a message is sent by a node 120. In another example, a block (e.g., a record, an entry, etc.) may be added to the ledger 123 each time a node 120 (e.g., the enterprise service component 121 of the node 120) performs an action in response to a message. In a further example, blocks (e.g., entries, records, etc.) of a ledger 123 may be modified when a message is sent by a node or when a node performs an action based on a message. Each ledger 123 may be stored in a data store (not illustrated in the figures) of a respective node 120. A persistent storage may be one or more devices that are capable of storing data. A persistent storage may be a local storage unit or a remote storage unit. Persistent storage may be a magnetic storage unit, optical storage unit, solid state storage unit, electronic storage units (main memory, cache, random access memory (RAM)), or similar storage unit. Persistent storage may also be a monolithic/single device or a distributed set of devices.

In one embodiment, a first node 120 or a first message component 122 (of the node 12) may transmit a message to a second node 120. For example, the first node 120 may transmit a message instructing or requesting a second enterprise service component 121 (of the second node 120) to perform an action. In another example, the first node 120 may transmit a message instruction two nodes 120 to perform an action, such as providing access to a file, copying a file to a different storage location, etc. The message may be addressed to the second node 120. For example, the message may indicate that the second node 120 is the recipient of the message by including an identifier for the second node 120 (e.g., a name, an alphanumeric value, etc. for the second node 120). The message may also indicate that the first node 120 is the sender of the message. For example, the message may include an identifier for the first node 120. Each message may also include an identifier for the message (e.g., a message identifier). This may allow other nodes 120 to reference the message when transmitting other messages. For example, another node may perform an action specified in a previous message and may create a block with the result of the action. The result may include the identifier for the previous message so that the node 120 that sent the previous message may determine whether the previous message was processed.

In another embodiment, the first node 120 may also transmit the message to one or more other nodes 120 of the blockchain system 110. For example, the first node 120 may transmit the message to all of the nodes 120 of the blockchain system 110 (including the second node 120) requesting that a number of the nodes 120 perform an action (e.g., requesting that five nodes compute an account balance). The first node 120 may also add a block (e.g., an entry, a record, etc.) to the ledger 123 of the node. The other nodes 120 may also add a block to their respective ledgers 123 when the other nodes 120 receive the message from the first node. The first node 120 may transmit the message to all of the nodes 120 (of the blockchain system 110) as part of the blockchain architecture/paradigm. This allows the enterprise service bus 100 to have a distributed record or ledger of the messages communicated via the enterprise service bus 100. The distributed nature of the record or ledger allows for more security against loss, more security against hacking, etc.

In one embodiment, a portion of the message may be encrypted by the first node 120. For example, the first node 120 may encrypt the payload (e.g., the content) of the message (that is transmitted to the second node 120) using a public key of the second node 120. This may prevent other nodes 120 from reading or accessing the message while still allowing the second node 120 to decrypt the payload of the message with a private key of the second node 120. In another embodiment, In one embodiment, the message component 122 may determine whether the message has been processed by the second node 120 (or by other nodes 120). For example, the message component 122 may analyze its ledger 1 to determine whether the ledger 123 includes a block (e.g., a record, an entry, etc.) with a second message from the second node 120, indicating that the first message was processed by the second node 120. In another example, the message component 122 may analyze its ledger 123 to determine whether the ledger includes a block that indicates whether the second node 120 was successful in performing an action (e.g., whether the second node 120 was able to debit or credit an account balance).

In one embodiment, the message component 122 may updated its ledger 123 to indicate that the message was processed by the second node 120 (or other nodes 120). For example, if the message component 122 (of a first node 120) determines that the second node 120 has processed the message (transmitted by the first node 120), the message component 122 may remove the block (e.g., record or entry) or the portion of the block that includes the message, from its ledger 123. The message component 122 may also transmit an additional message (or other data) to the other nodes 120 indicating that the block (or portion of the block) that included the message should be removed from the respective ledgers 123 of the other nodes 120. This may allow the enterpriser service bus 100 reduce the size of the ledgers 123 (e.g., the distributed ledger) and may help prevent the ledgers 123 from using too much storage space. In another embodiment, the message component 122 may update its ledger 123 to indicate that the message was processed by the second node 120 (or other nodes 120) after a period of time has elapsed or passed. For example, the message component 122 may not remove a block (or a portion of a block) that includes the message until the message has been processed and a threshold period of time has elapsed. The threshold hold period of time may be different in different embodiments. For example, the threshold period of time may be a few hours, a few days, two weeks, three months, one year, etc. in some embodiments, the message component 122 may periodically analyze its ledger 123 to determine whether blocks should be removed (e.g., deleted). For example, the message component 122 may analyze its ledger 123 every day, every week, every month, etc., to determine whether blocks should be removed.

In one embodiment, a first message component 122 of a first node 120 may receive a message transmitted by a second node 120. For example, the first node 120 may determine whether the message was addressed to the first node 120 by the second node 120 (e.g., may determine whether the second node 120 included an identifier for the first node 120 in the message). In another example, the first node 120 may receive a message by checking its ledger 123. As discussed above, a message may be transmitted or broadcast of all nodes of the blockchain system 110 so that the message may be recorded in multiple ledgers 130 of multiples nodes 120. Each node 120 may also forward the message to other nodes 120, in order to propagate the message to as many nodes 120 as possible in the blockchain system 110. Each node 120 may create a block (e.g., an entry, a record, etc.) or update a block in its respective ledger 123 when a message is received. The first node 120 may determine that a message was received from a second node 120 by determining whether a block that includes the message was added to the ledger 123 (e.g., to the distributed ledger). For example, the first node 120 may determine that a new block was added to the ledger 123.

In one embodiment, the message component 122 may determine whether the first node 120 (e.g., the first enterprise service component 121 of the first node 120) should process the message. For example, the message component 122 may analyze the message to determine whether the message is requesting an action to be performed. The message component 122 may determine whether or not the enterprise service component 121 is capable of performing the action requested in the message. In another example, the message component 122 may determine whether the message was addressed to the first node. For example, the message component 122 may determine whether the messages includes an identifier for the first node 120 (or the first enterprise service component 121) as the recipient of the message. In a further example, the message component 122 may determine whether a message has been completely processed by one or more other nodes 10 of the blockchain system 110. For example, a message may request any five nodes 120 to perform an action. The message component 122 may determine whether five nodes 120 of the blockchain system have performed the action requested in the message. For example, the message component 122 of the first node may analyze the ledger 123 of the first node to determine if the ledger 123 includes blocks that indicate the results of the actions performed by the other five nodes. If the message component 122 sees five results in the ledger 123, the message component 122 may determine that the message has been completely processed and may not further process the message. If the message component 122 determines that there are less than five results in the ledger 123, the message component 122 may determine that the message has not been completely processed (e.g., that fewer than the requested number of nodes have processed the message) and the message component 122 may process the message.

If the message component 122 determines that the first node 120 should process the message, the message component 122 may process the message (transmitted by the second node 120). In one embodiment, the first node 120 (e.g., the enterprise service component 121) may perform an action, operation, function, etc., indicated or requested in the message. For example, the message may indicate that a user should be granted access to a file. The enterprise service component 121 may grant the user access to the file by updating a database to indicate that the user now has access to the file. In another example, the message may indicate that a user wants to change their mailing address. In another embodiment, the message component 122 may decrypt the payload of the message. For example, the message may be encrypted using a public key of the first node 120 and the message component 122 may decrypt the message using the private key of the first node 120.

In one embodiment, the message may not instruct or request the first node 120 to perform an action, operation function, etc., but may provide information or data to the first node 120. For example, the message may include an updated mailing address for a user. In another example, the message may indicate that the user has subscribed to a new service (e.g., to a new music streaming service). The first node 120 may process a message (which does not include a request of an instruction to perform an action) by analyzing the message and accessing the updated data. The first node 120 may also store the data provided in the message for later use. For example, the first node 120 may store the indication that the user has subscribed to a new music streaming service so that when the user later requests access to the new music streaming service, the user will be allowed to access the new music streaming service.

In one embodiment, the message component 122 of the first node 120 may update the ledger 123 to indicate that the message was processed by the first node 120. For example, the message component 122 may add a block (e.g., an entry, a record, etc.) to the ledger 123 or may update an existing block, to indicate that a message was processed. The message component 122 may also transmit the block that indicates that the message was processed to other nodes 120, or may transmit a message to other nodes 120 indicating that the other nodes 120 should add or update a block to their respective ledgers to indicate that the message was processed. In some embodiments, the message component 122 of the first node 120 may update the ledger 123 to indicate that message was processed by removing the block that includes the message, from the ledger 123, as discussed above. For example, after the first node 120 has processed the message and after a threshold period of time has elapsed (e.g., after two years), the message component 122 may remove the block that includes the message from the ledger 123.

In some embodiments, one or more nodes 120 of the blockchain system 110 may become disconnected from other nodes 120, or may become disconnected from the blockchain system 110. For example, a node 120 may become inoperable (e.g., may crash) or may be reset for a period of time. In another example, a network failure (e.g., a failure in one or more portions of the network 115) may cause a node 120 to be unable to communicate with other nodes 120. If one or more nodes 120 are disconnected from other nodes 120 or the blockchain system 110, the one or more nodes 120 may not receive all of the messages or results that are communicated between the other nodes 120. This may result in different groups of nodes 120 having different copies or versions of the ledger 123.

In one embodiment, a message component 122 may determine that a first group of nodes 120 has ledgers 123 that are different from the ledgers 123 of a second group of nodes 120. For example, the message component 122 may determine that eight nodes 120 have a first set of ledgers 123 that are identical, but that five other nodes 120 have a second set of ledgers 123 that are different from the first set of ledgers. Although the ledgers 123 in the second set of ledgers 123 may be identical to each other, the ledgers 123 in the second set of ledgers 123 may be different from the ledgers 123 in the first set of ledgers 123. In some embodiments, the message component 122 (of a node 120) may periodically compare its ledger 123 with the ledgers 123 of other nodes 120 to determine whether there are different versions or copies of the ledger 123 in the blockchain system 110. For example, the message component 122 may compare its ledger with ledgers 123 of other nodes every few hours, every week, every two weeks, etc.

In one embodiment, a message component 122 may reconcile the different copies, versions, etc., of the ledgers 123 that are distributed among the nodes 120. For example, if two copies or versions of the ledgers are distributed among the different nodes 120, the message component 122 may reconcile the two copies or versions of the ledgers 123.

In one embodiment, the message component 122 may analyze the different versions or copies of the ledgers 123 to determine whether one copy of the ledgers 123 have reversible messages. A reversible message may be a message where an action requested by the message and performed by one or more nodes 120, may be reversed. For example, a reversible message may be a message that requested that a user's account be debited by a certain amount. This action (e.g., debiting the account by the certain amount) may be reversible because the user's account can be credited by the same amount, thus reversing the message. A reversible message may also be a message where the content of the message may be reversible. For example, if a message indicated a new email address for a user, the message may be reversed by using the user's previous email address. The user's previous email address may be used by transmitting another message with the previous email address to reverse or undo the use of the new email address. In one embodiment, the message component 122 may determine that the messages in the copies or versions of the ledgers 123 that have only reversible messages, may reversed. The copies or versions of the ledgers 123 that have irreversible messages may be used as the final or controlling copy or version of the ledgers 123. For example, the copy or the version of the ledger 123 that includes irreversible messages may be transmitted or propagated to all nodes 120 and each node may begin using that copy or version of the ledger 123.

In one embodiment, the message component 122 may analyze the different versions or copies of the ledgers 123 to determine the sizes of the different versions of copies of the ledgers 123. For example, the message component 122 may determine that a first set of ledgers 123 (e.g., one version of the ledger 123) have a first number of blocks has a first size), and that a second set of ledgers 123 (e.g., another version of the ledger 123) have a second number of blocks (e.g., has a second size). The message component 122 may determine that the copy or version of the ledger with the largest size is the one that should be used as the final or controlling copy or version of the ledgers 123. For example, the copy or the version of the ledger 123 that has the most blocks (e.g., has the largest size) may be transmitted or propagated to a set of nodes 120 that have the shorter version of the ledger, so that the set of nodes 120 may begin using that longer or larger version of the ledger 123.

In one embodiment, the message component 122 may analyze the different versions or copies of the ledgers 123 the number of nodes 120 that have each copy or version of the ledger 123. For example, if there are three versions of the ledgers 123, the message component 122 may determine that four nodes 120 have a first version of the ledgers 123, two nodes have a second version of the ledgers 123, and two nodes have a third version of the ledgers 123. The message component 122 may determine that the first version of the ledger 123 should be used as the final or controlling copy or version of the ledgers 123 since the most nodes 120 have the first version of the ledger 123. The message component may also select the version of ledger 123 to be used as the final or controlling copy or version of the ledgers 123 where the majority of the nodes 120 have that version of the ledger 123.

In some embodiments, the use of a computationally expensive task when creating blocks in the ledgers 123 may be reduced or relaxed, due to the use of the enterprise service bus 100 for messaging purposes. A generally blockchain system may use a computationally expensive task (e.g., a task that uses a large amount of processing power or capability, such as computer large hashes, large numbers, etc.) to help maintain the authenticity or integrity of a ledger (e.g., a distributed ledger).

As discussed above, failures or malfunctions in an enterprise service bus may result in an inconsistent state across the different enterpriser service components 121. In addition, an enterprise service bus may be vulnerable to malicious uses that may attempt to manipulate the messages communicated via the enterprise service bus. The implementations, embodiments, and examples disclosed herein may help address the above-noted and other deficiencies or problems by using a blockchain system 110 in the enterprise service bus 100. The blockchain system 110 may include a distributed ledger (e.g., the ledgers 123 that are distributed across all of the nodes 120 in the blockchain system 110). If portions of the enterprise service bus fails and messages are not delivered, the blockchain system has the capability to reconcile the different versions of the distributed ledger. The ability to reconcile the different versions of the distributed ledger may be a feature provided by the blockchain system and allows for the enterprise service components 121 to be restored to back to a consistent state. In addition, the distributed nature of the may make it harder for a malicious user to manipulate the messages. For example, a malicious user may be able to compromise or intercept messages from one node 120. However, because there are multiple nodes 120 (each with their own copy of the ledger), the blockchain system 110 may discard or ignore the ledger 123 on the comprised node 120 due to the operation of the blockchain system 110.

Figure 2A:
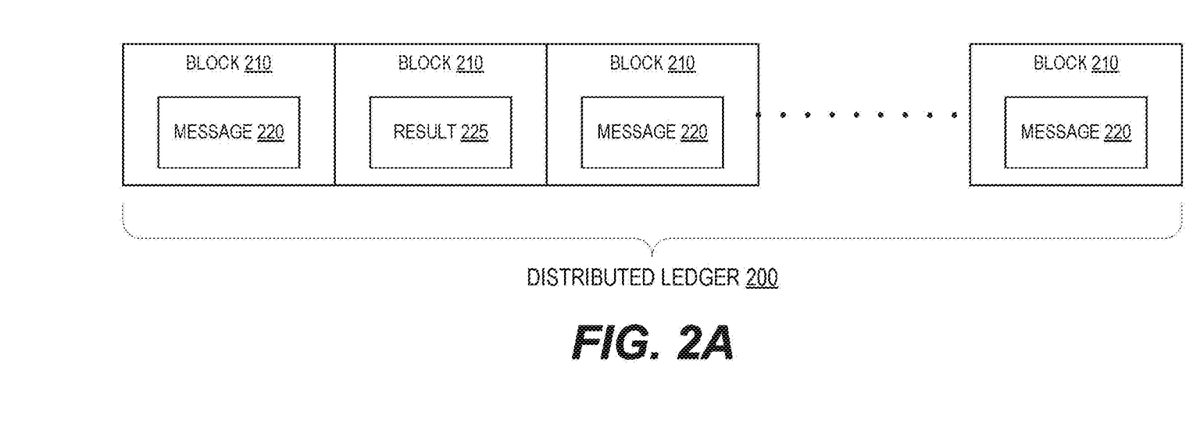
FIG. 2A is a block diagram that illustrates an example distributed ledger, in accordance with some embodiments of the present disclosure.

FIG. 2A is a block diagram that illustrates an example distributed ledger 200, in accordance with some embodiments of the present disclosure. The distributed ledger 200 may also be referred to as a ledger. Copies of the distributed ledger 200 may be stored on nodes of a blockchain system. For example, each node of the blockchain system may store a copy of the distributed ledger 200, as discussed above. The blockchain system may be part of an enterprise service bus. As discussed above, the enterprise service bus may handle the transmission and receipt of the messages (e.g., may route a message to the appropriate recipient), may convert messages from one form or type to another form or type, or may inform different enterprise service components via a message when events occur or when actions are performed by the different portions. In one embodiment, the distribute ledger 200 may be a record of messages, results, transactions, events, actions, operations, and/or other types of data that are communicated between the nodes of a blockchain system (e.g., between nodes 120 of the block chain system 110 illustrated in FIG. 1), as discussed above.

Nodes in the enterprise service bus may transmit a message to one or more other nodes, as discussed above. The message may request the one or more other nodes to perform an action, or may provide data to the one or more other nodes. For example, a first node may transmit a message requesting that a second node credit an account or a message may provide. In another example, a first node may transmit a message with information (e.g., a birthday, a mailing address, etc., of a user) requested by a second node in a previous message. In one embodiment, a first node may create block 210 in the ledger 200, each time the first node sends a message 220 to one or more other nodes. The block 210 may include the message 220 that was transmitted by the node. When other nodes receive the message transmitted by the first node, the other nodes may also create a block 210 that includes the received message 220, in their respective distributed ledgers 200. In another embodiment, a first node may create block 210 in the ledger 200 each time the node 200 performs an action. For example, the first node may receive a previous message from a second node requesting that the first node ad a user to a list of authorized users (e.g., requesting that the first node perform an action). The first node may add the user to the list of authorized users and may create a block 210 that includes a result 225 of action performed by the first node. For example, the result 225 may include data indicating whether the action was performed by the first node or may indicate the result of the action performed by the first node. As illustrated in FIG. 2A, each block 210 includes a message 220 or a result 225.

In some embodiments, one or more blocks 210 may be removed (e.g., deleted) from the distribute ledger, as discussed above. For example, a block 210 that contains a message 220 may be removed from the ledger if there is a block 210 that includes a result 225 indicating that an action requested in the message 220 was performed (e.g., if there is block 210 or a result 225 that indicates that the message 220 was processed). The block 210 that contains the result 225 may also be removed. Both of the blocks 210 (with the message 220 and the result 225) may be removed after a threshold period of time has passed. For example, both of the blocks 210 may be removed after at least a year has passed.

Figure 2B:
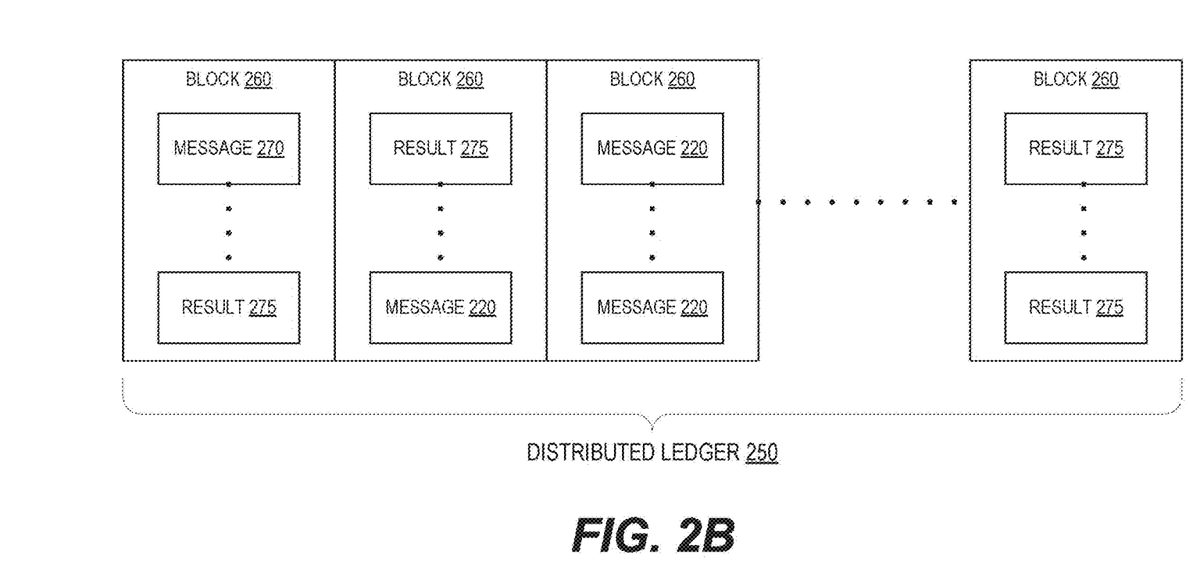
FIG. 2B is a block diagram that illustrates an example distributed ledger, in accordance with some embodiments of the present disclosure.

FIG. 2B is a block diagram that illustrates an example distributed ledger 250, in accordance with some embodiments of the present disclosure. The distributed ledger 250 may also be referred to as a ledger. Copies of the distributed ledger 250 may be stored on each of a blockchain system, as discussed above. The blockchain system may be part of an enterprise service bus. As discussed above, the enterprise service bus may handle the transmission and receipt of the messages (e.g., may route a message to the appropriate recipient), may convert messages from one form or type to another form or type, or may inform different enterprise service components via a message when events occur or when actions are performed by the different portions. In one embodiment, the distribute ledger 250 may be a record of messages, results, transactions, events, actions, operations, and/or other types of data that are communicated between the nodes of a blockchain system (e.g., between nodes 120 of the block chain system 110 illustrated in FIG. 1), as discussed above.

Nodes in the enterprise service bus may transmit a message to one or more other nodes, as discussed above. The message may request the one or more other nodes to perform an action, or may provide data to the one or more other nodes. A node may also transmit messages indicating the results of an action performed by the node (e.g., confirming that an action was performed, indicating that an action was successful, etc.). In one embodiment, a first node may create block 260 in the ledger 250. The first node may include a combination of messages 270 and results 275 in each block 260. For example, a block 260 may include messages 270, results 275, or messages 270 and results 275. A node may store the messages 270 and the results 275 that are received until there are enough messages 270 and results 275 for one block 260. The number of messages 270 and results 275 in a block 260 may vary in different embodiments.

In some embodiments, one or more blocks 260 may be removed (e.g., deleted) from the distribute ledger, as discussed above. For example, a block 260 that contains messages 270 and results 275 may be removed from the ledger if there is a block 260 that includes results 275 indicating that an actions requested in the messages 270 were performed. The block 260 may be removed after a threshold period of time has passed. For example, block 260 may be removed after at least a year has passed.

Figure 3:
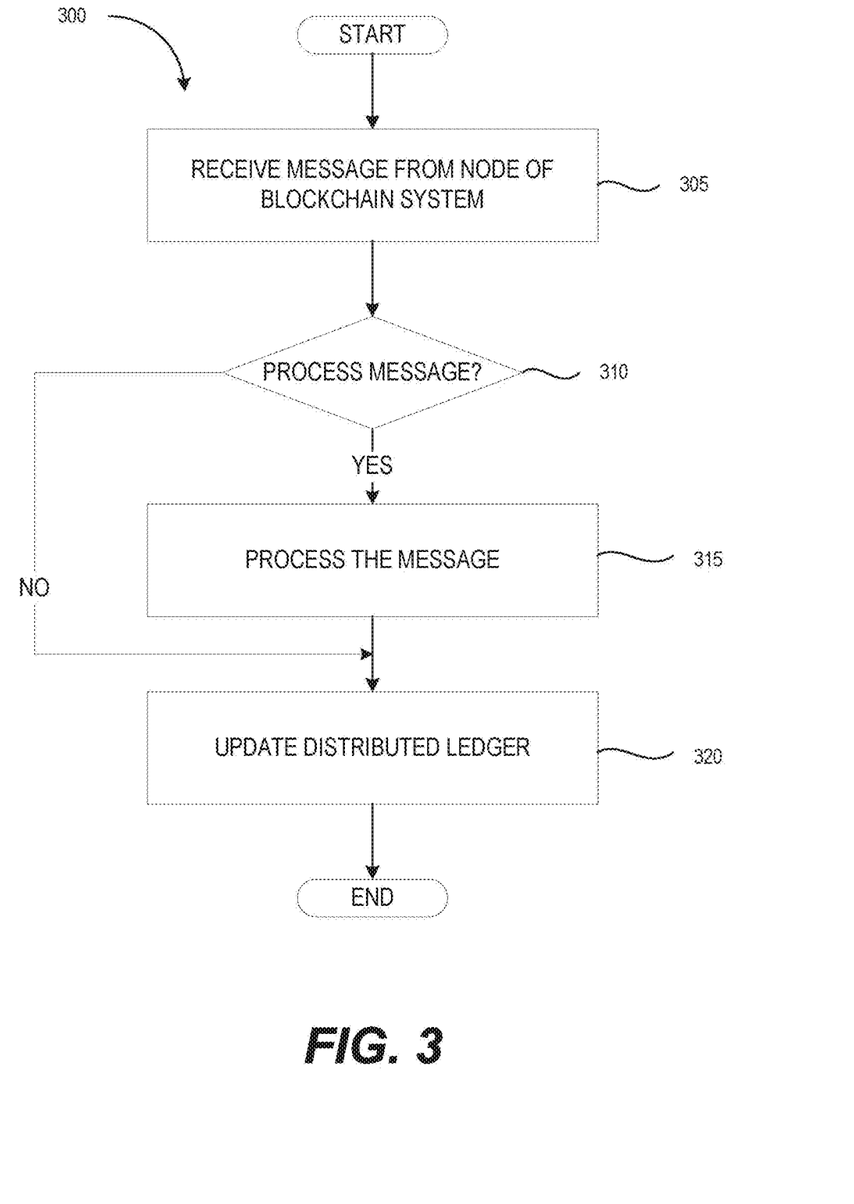
FIG. 3 is a flow diagram of a method of communicating messages using a blockchain system, in accordance with some embodiments.

FIG. 3 is a flow diagram of a method 300 of communicating messages using a blockchain system, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a message component (e.g., message component 121 illustrated in FIG. 1), a node (e.g., node 120 illustrated in FIG. 1), and/or one or more computing devices.

The method 300 begins at block 305, where the method 300 receives a message. As discussed above, the message may be received from a node of a blockchain system that is used in an enterprise service bus. The message may also be received by other nodes of the blockchain system. At block 310, the method 300 determines whether to process the message. For example, the method 300 may determine whether the message was addressed to a particular node (e.g., includes an identifier for the particular node), as discussed above. In another example, the method 300 may determine whether a threshold number of nodes have already processed the message by analyzing an distributed ledger to determine if a threshold number of results are in the distributed ledger, as discussed above.

If the method 300 determines that the message should be processed, the method 300 may process the message at block 315. For example, the method 300 may decrypt a payload of the message using a private key, as discussed above. In another example, the method 300 may perform an action requested in the message (e.g., debit or credit a user's account, provide or grant access to a file, etc.), as discussed above. In a further example, the method 300 may processing the message by processing the data in the message (e.g., may update a user's email address based on a new email address indicated in the message). If the method 300 determines that the message should not be processed, the method 300 may proceed to block 320. The method 300 may update a distributed ledger at block 320. For example, the method 300 may add a block that includes the received message, to the distributed ledger. The method 300 may also add a block with a result (e.g., a result of processing the message) if the method 300 processed the message at block 310.

Figure 4:
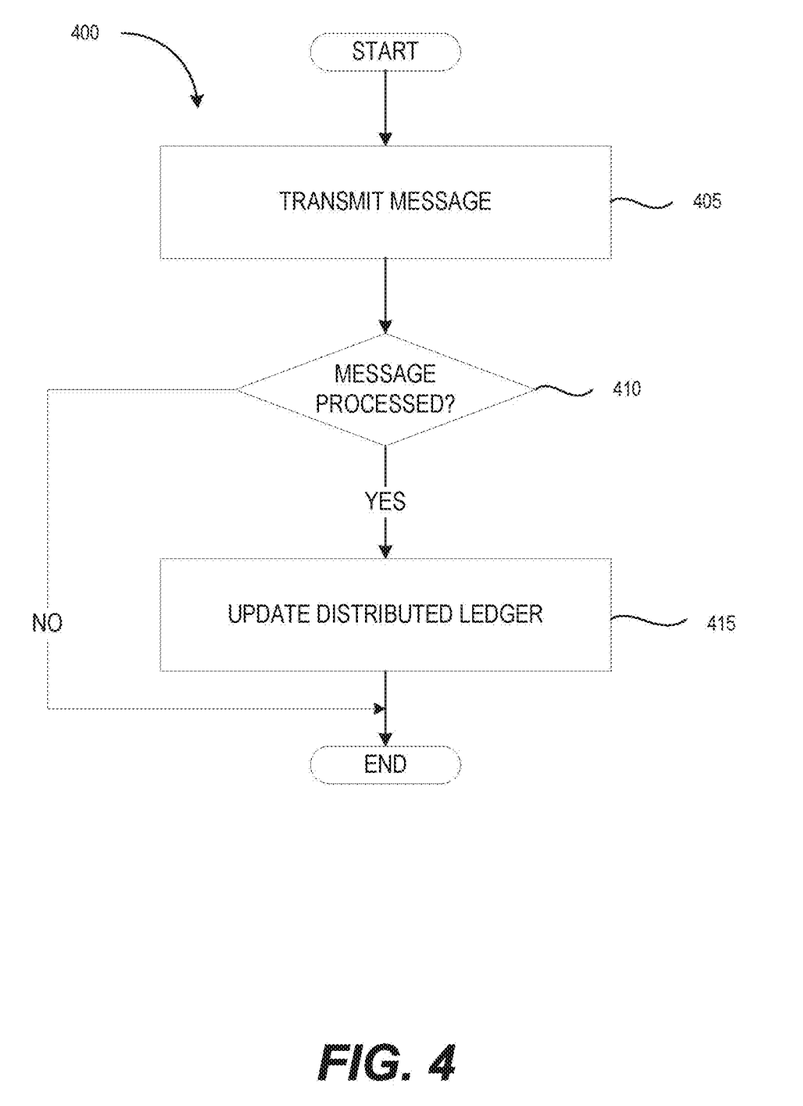
FIG. 4 is a flow diagram of a method of communicating messages using a blockchain system, in accordance with some embodiments.

FIG. 4 is a flow diagram of a method 400 of communicating messages using a blockchain system, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a message component (e.g., message component 121 illustrated in FIG. 1), a node (e.g., node 120 illustrated in FIG. 1), and/or one or more computing devices.

The method 400 begins at block 405, where the method 400 transmits a message to one or more nodes of a blockchain system. As discussed above, the method 400 may transmit the message to all nodes of the blockchain system so that that the message can be recorded in the distributed ledgers (e.g., ledgers). The method 400 may also create a block that includes the transmitted message, in a distributed ledger to record the transmission of the message. At block 410, the method 400 may determine whether the message was processed. For example, the method 400 may analyze a distributed ledger to determine whether the distributed ledger includes a block that includes a result for the message, as discussed above. If the message was processed, the method 400 may optionally updated the distributed ledger at block 415. For example, the method 400 may determine whether a period of time (e.g., two months, one year, etc.) has passed, and may remove the block that includes the message after the period of time has elapsed, as discussed above. If the message has not been processed, the method 400 ends.

Figure 5:
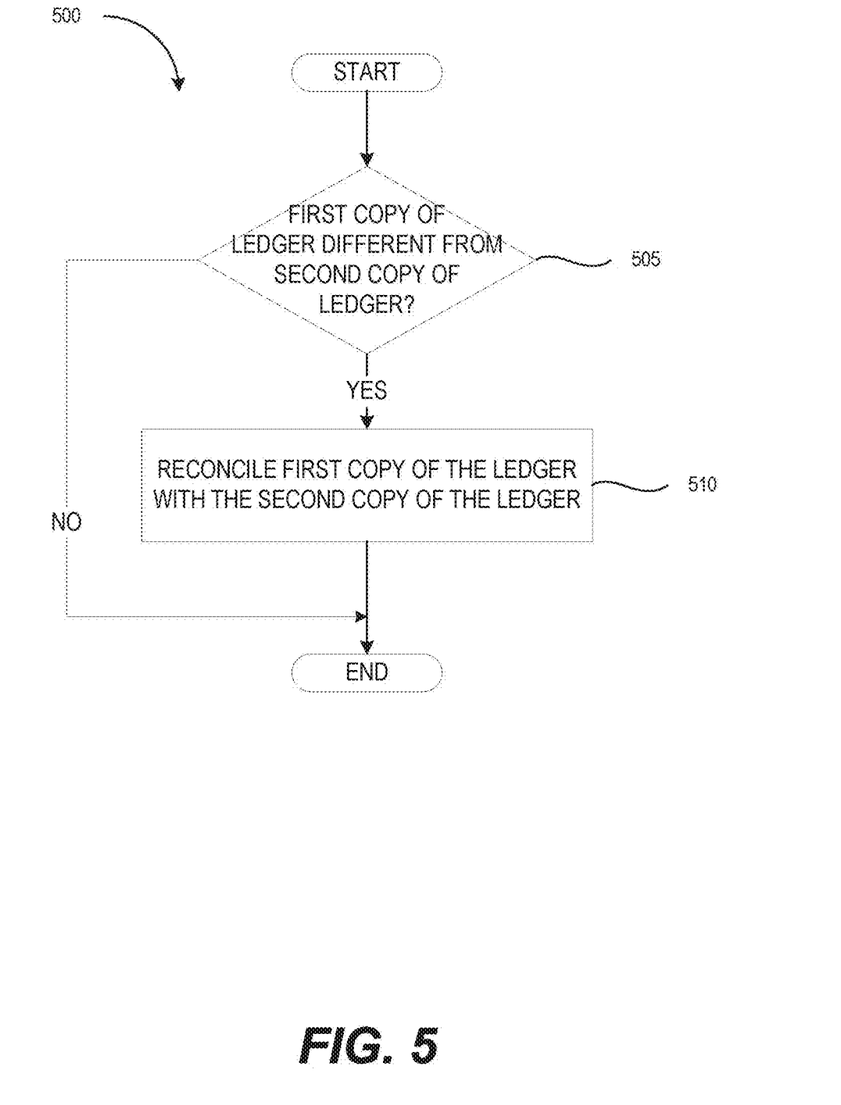
FIG. 5 is a flow diagram of a method of communicating messages using a blockchain system, in accordance with some embodiments.

FIG. 5 is a flow diagram of a method 500 of communicating messages using a blockchain system, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a message component (e.g., message component 121 illustrated in FIG. 1), a node (e.g., node 120 illustrated in FIG. 1), and/or one or more computing devices.

The method 500 begins at block 505, where the method 500 determines whether a first copy of a ledger (e.g., a distributed ledger) is different from a second copy of the ledger. As discussed above, the first copy of the ledger may be stored at a first node of a blockchain system of an enterprise service bus and the second copy of the ledger may be stored at a second node of the blockchain system of the enterprise service bus. If the first copy of the ledger and the second copy of the ledger are not different (e.g., are the same, are identical, etc.), the method 500 ends. If the first copy of the ledger is different from the second copy of the ledger (e.g., has more blocks, has fewer blocks, has different blocks, etc.), the method 500 may reconcile the first copy of the ledger with the second copy of the ledger at block 510. For example, the method 500 may determine that the copy or version of the ledger with the largest size is the one that should be used as the final or controlling copy or version of the ledger, as discussed above. 1n another example, the method 500 may determine that the copy or version of the ledger that his stored on the most nodes may be be used as the final or controlling copy or version of the ledger, as discussed above. In a further example, the method may determine that the copy or version of the ledger that has irreversible messages may be used as the final or controlling copy or version of the ledger, as discussed above.

Figure 6:
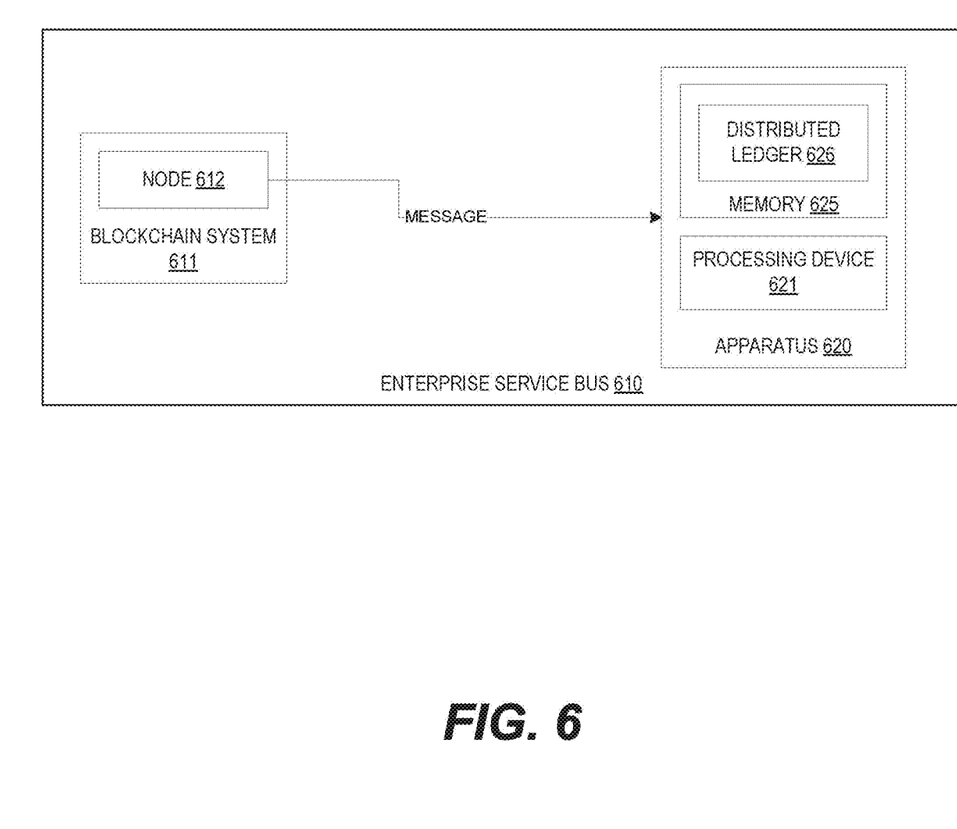
FIG. 6 is a block diagram of an example apparatus that may perform one or more of the operations described herein, in accordance with some embodiments of the present disclosure.

FIG. 6 is a block diagram of an example apparatus 600 that may perform one or more of the operations described herein, in accordance with some embodiments. The apparatus 600 includes a memory 625 to a distributed ledger 626. The apparatus 600 also includes a processing device 621 operatively coupled to the memory. The processing device 621 may receive a message transmitted by a node 612 of a blockchain system 611 of an enterprise service bus 610. The blockchain system 611 is configured to store a plurality of messages communicated via the enterprise service bus 610 in the distributed ledger 626. The processing device 621 may determine whether to process the message. The processing device 621 may also process the message in response to determining that the message should be processed. The processing device may further update the distributed ledger 626 to indicate that the message has been processed.

Figure 7:
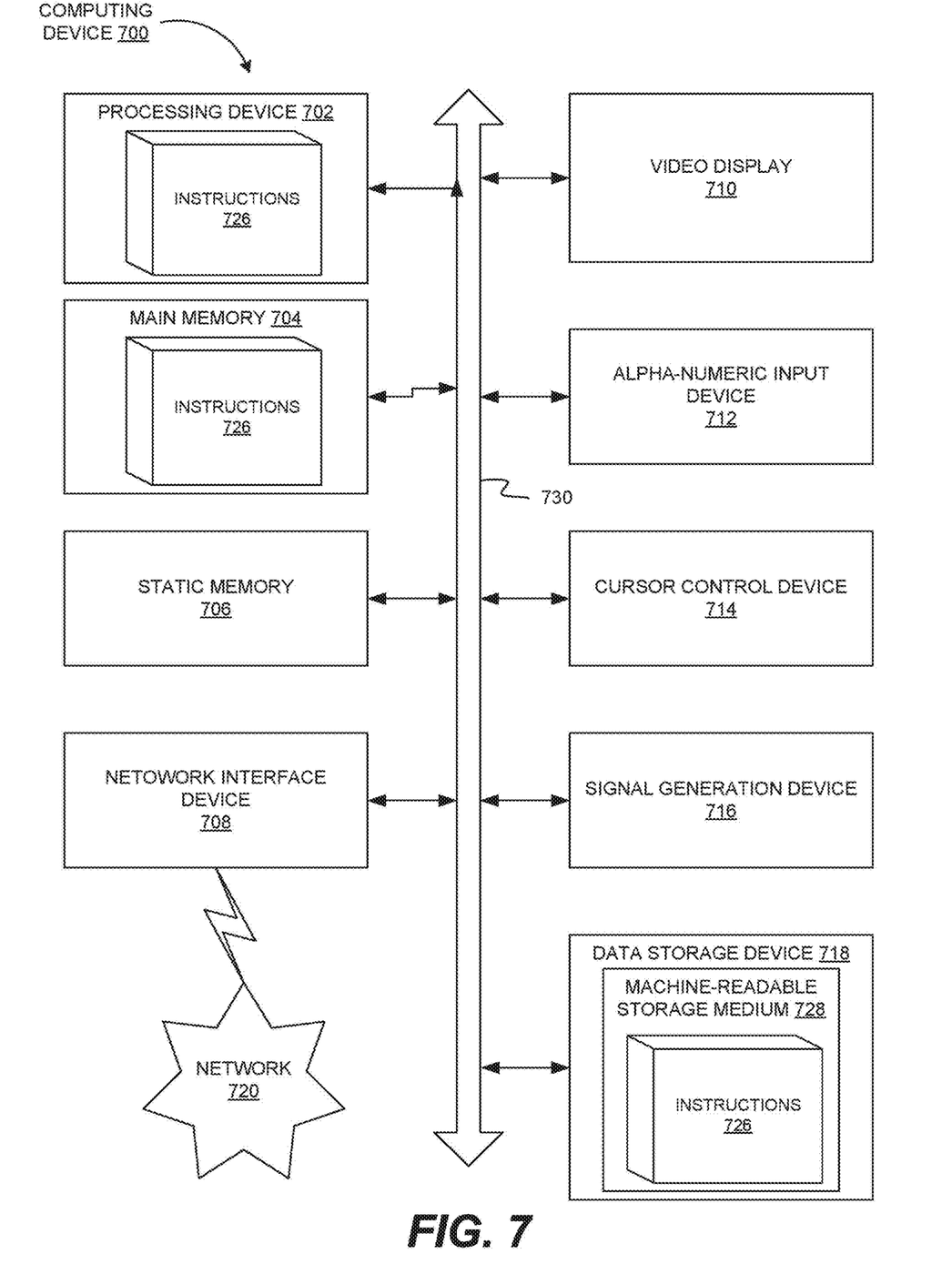
FIG. 7 is a block diagram of an example computing device that may perform one or more of the operations described herein, in accordance with some embodiments of the present disclosure.

FIG. 7 is a block diagram of an example computing device 700 that may perform one or more of the operations described herein, in accordance with some embodiments. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions, e.g., instructions for carrying out the operations described herein, in accordance with one or more aspects of the present disclosure. Instructions 726 implementing nodes, enterprise service components, or message components may also reside, completely or at least partially, within main memory 704 and/or within processing device 702 during execution thereof by computing device 700, main memory 704 and processing device 702 also constituting computer-readable media. The instructions may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
receiving, by a first node of a blockchain system within an enterprise service bus, a message transmitted by a second node of the blockchain system via the enterprise service bus to the first node and a third node of the blockchain system, wherein the blockchain system is to store a plurality of messages communicated via the enterprise service bus in a distributed ledger;
determining, by the first node based on the distributed ledger, an inability of the third node to receive the message due to a malfunction of the enterprise service bus, wherein the malfunction of the enterprise service bus prevents the third node from communicating with the first node;
processing, by the first node, the message in response to determining the inability of the third node to receive the message via the enterprise service bus;
updating the distributed ledger to indicate that the message has been processed by the first node; and
updating the distributed ledger to indicate the inability of the third node to receive the message due to the malfunction of the enterprise service bus.

2. The method of claim 1, wherein receiving the message comprises:
determining that a block comprising the message has been added to the distributed ledger.

3. The method of claim 1, further comprising:
determining whether the message is addressed to the first node.

4. The method of claim 1, further comprising reconciling a first copy of the distributed ledger with a second copy of the distributed ledger.

5. The method of claim 1 further comprising:
decrypting the message using a private key of the first node, wherein a payload of the message is encrypted with a public key of the first node.

6. The method of claim 1, wherein the distributed ledger is distributed across a plurality of nodes of the blockchain system.

7. The method of claim 1, further comprising:
determining that a first group of nodes of the blockchain system comprises a first copy of the distributed ledger and that a second group of nodes of the blockchain system comprises a second copy of the distributed ledger, wherein the first copy of the distributed ledger is different from the second copy of the distributed ledger.

8. The method of claim 7, further comprising:
reconciling the first copy of the distributed ledger with the second copy of the distributed ledger.

9. The method of claim 8, wherein reconciling the first copy of the distributed ledger with the second copy of the distributed ledger comprises:
determining that the first copy of the distributed ledger comprises reversible messages; and
reversing one or more actions based on the reversible messages.

10. The method of claim 8, wherein reconciling the first copy of the distributed ledger with the second copy of the distributed ledger comprises:
determining that the first copy of the distributed ledger is shorter than the second copy of the distributed ledger; and
providing the first copy of the distributed ledger to a set of nodes that have the second copy of the distributed ledger.

11. The method of claim 8, wherein reconciling the first copy of the distributed ledger with the second copy of the distributed ledger comprises:
determining that a larger number of nodes have the first copy of the distributed ledger than the second copy of the distributed ledger; and
providing the first copy of the distributed ledger to a set of nodes that have the second copy of the distributed ledger.

12. A method, comprising:
transmitting, by a first node of a blockchain system within an enterprise service bus, a message to a second node of the blockchain system via the enterprise service bus, wherein the blockchain system is to store a plurality of messages communicated via the enterprise service bus in a distributed ledger, wherein the message is addressed to the second node;
determining, by the first node based on the distributed ledger, an inability of the second node to receive the message due to a malfunction of the enterprise service bus, wherein the malfunction of the enterprise service bus prevents the second node from communicating with the first node;
updating, by the first node in response to determining the inability of the second node to receive the message via the enterprise service bus, the distributed ledger to indicate the inability of the second node to receive the message due to the malfunction of the enterprise service bus.

13. The method of claim 12, wherein transmitting the message comprises:
adding a block to the distributed ledger, wherein the block comprises the message.

14. The method of claim 13, wherein updating the distributed ledger comprises:
removing the block from the distributed ledger.

15. The method of claim 12, further comprising:
encrypting a payload of the message with a public key of the second node.

16. The method of claim 11, further comprising reconciling a first copy of the distributed ledger with a second copy of the distributed ledger.

17. An apparatus, comprising:
a memory to store a distributed ledger; and
a processing device of a first node of a blockchain system, the processing device operatively coupled to the memory, the processing device to:
receive a message transmitted by a second node of the blockchain system within an enterprise service bus to the processing device of the first node and a third node of the blockchain system via the enterprise service bus, wherein the blockchain system is to store a plurality of messages communicated via the enterprise service bus in the distributed ledger;
determine, based on the distributed ledger, an inability of the third node to receive the message due to a malfunction of the enterprise service bus, wherein the malfunction of the enterprise service bus prevents the third node from communicating with the node;
process the message in response to determining the inability of the third node to receive the message via the enterprise service bus;
update the distributed ledger to indicate that the message has been processed by the processing device of the first node; and
update the distributed ledger to indicate the inability of the third node to receive the message due to the malfunction of the enterprise service bus.

18. The apparatus of claim 17, wherein the processing device is further to determine that a first group of nodes of the blockchain system comprises a first copy of the distributed ledger and that a second group of nodes of the blockchain system comprises a second copy of the distributed ledger, wherein the first copy of the distributed ledger is different from the second copy of the distributed ledger.

19. The apparatus of claim 17, wherein the processing device is further to reconcile the first copy of the distributed ledger with the second copy of the distributed ledger.

20. The apparatus of claim 17, wherein to process the message the processing device is further to decrypt the message using a private key of the apparatus, wherein a payload of the message is encrypted with a public key of the apparatus.

* * * * *